US010974837B2

(12) United States Patent
Nicq et al.

(10) Patent No.: US 10,974,837 B2
(45) Date of Patent: Apr. 13, 2021

(54) PROPULSION DEVICE FOR AN AIRCRAFT, SUCH AS A TURBOPROP

(71) Applicant: SAFRAN AIRCRAFT ENGINES, Paris (FR)

(72) Inventors: Geoffroy Marie Gérard Nicq, Moissy-Cramayel (FR); Nora El Ghannam, Moissy-Cramayel (FR); Mathieu Jean Jacques Santin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 110 days.

(21) Appl. No.: 16/317,377

(22) PCT Filed: Jul. 11, 2017

(86) PCT No.: PCT/FR2017/051904
§ 371 (c)(1),
(2) Date: Jan. 11, 2019

(87) PCT Pub. No.: WO2018/011519
PCT Pub. Date: Jan. 18, 2018

(65) Prior Publication Data
US 2019/0285029 A1 Sep. 19, 2019

(30) Foreign Application Priority Data
Jul. 11, 2016 (FR) ...................... 1656639

(51) Int. Cl.
*F02C 7/36* (2006.01)
*B64D 27/26* (2006.01)
*F01D 25/28* (2006.01)

(52) U.S. Cl.
CPC ............. *B64D 27/26* (2013.01); *F01D 25/28* (2013.01); *F02C 7/36* (2013.01);
(Continued)

(58) Field of Classification Search
CPC ............ B64C 27/001; B64C 2027/003; B64C 2027/004; F16F 7/1034; F16F 15/02; F16H 61/4096
See application file for complete search history.

(56) References Cited

U.S. PATENT DOCUMENTS 4,991,431 A * 2/1991 Gaither ................... G01L 5/133
73/112.01
5,127,607 A * 7/1992 McGuire ............... B60K 5/1216
244/54

(Continued)

FOREIGN PATENT DOCUMENTS

FR 2916736 A1 12/2008
WO WO 97/43561 A1 11/1997
WO WO 2015/074043 A2 5/2015

OTHER PUBLICATIONS

International Patent Application No. PCT/FR2017/051904, International Search Report and Written Opinion dated Oct. 19, 2017, 8 pgs. (relevance in citations and English translation of ISR).

*Primary Examiner* — Justin D Seabe
(74) *Attorney, Agent, or Firm* — Lathrop GPM LLP

(57) ABSTRACT

The invention concerns a propulsion device (1) comprising a torque generator (2) driving an output shaft (3) via a power gearbox (4), the output shaft (3) being rotatably coupled to a thruster (5), said power gearbox (4) being fixed on a frame (7) by means of suspension means (8, 14, 15), said suspension means including hydraulic torque recovery means comprising at least a first hydraulic system (15) and a second hydraulic system (15) spaced from each other, each hydraulic system (15) having a pressure chamber whose volume varies according to the position of the housing (9) of the power gearbox (4) relative to the frame (7), the pressure chambers of the hydraulic systems (15) being connected by
(Continued)

a capillary so that a hydraulic fluid is able to flow from one pressure chamber to another via the capillary.

8 Claims, 2 Drawing Sheets

(52) U.S. Cl.
CPC .. *B64D 2027/266* (2013.01); *F05D 2220/323* (2013.01); *F05D 2260/30* (2013.01)

(56) References Cited

U.S. PATENT DOCUMENTS

| | | | | |
|---|---|---|---|---|
| 5,918,833 | A | * | 7/1999 | Najand ................ B60K 5/1208 244/54 |
| 7,617,761 | B2 | * | 11/2009 | Gray, Jr. .................. B60K 6/12 91/506 |
| 8,226,028 | B2 | * | 7/2012 | Marche .................. B64D 27/12 244/54 |
| 2012/0117958 | A1 | * | 5/2012 | Caldwell ................ F03D 9/255 60/327 |

* cited by examiner

PROPULSION DEVICE FOR AN AIRCRAFT, SUCH AS A TURBOPROP

CROSS-REFERENCE TO RELATED APPLICATIONS

This application is a 35 U.S.C. § 371 filing of International Application No. PCT/FR2017/051904, filed Jul. 11, 2017, which claims the benefit of priority to French Patent Application No. 1656639, filed Jul. 11, 2016, each of which is incorporated herein by reference in its entirety.

The present invention concerns a propulsion device for an aircraft such as for example a turboprop.

A propulsion device typically consists of a torque generator driving an output shaft rotatably coupled to a thruster through a power transmission box.

The torque generator is, for example, a turbomachine, in the case of a turboprop engine, or a piston engine, the propeller being generally a propeller with blades equipped with or without blade timing means to adjust the angular position of the blades.

The torque generator is fixed to a frame or cradle, by means of flexible connections formed for example by insulators. The frame allows the propulsion system to be suspended from an aircraft structure, for example on a wing or on a pylon attached to the fuselage.

The power transmission, also known as a PGB (Power Gear Box), is a gearbox designed to reduce the rotational speed of the torque generator shaft, so as to drive the output shaft equipped with the thruster.

The power transmission has a housing and, for example, an epicyclic gearbox comprising a planetary gearbox rotating satellites mounted on a satellite carrier and rotating inside a gear ring of the epicyclic gearbox. The said housing is mounted on the frame by means of flexible connections formed, for example, by insulators.

Isolators are used to isolate vibrations generated during operation, in order to reduce noise or fatigue phenomena.

In order to ensure the regulation of the propulsion system, it is necessary to take into account the torque transmitted to the output shaft driving the thruster, i.e. the propeller.

To do this, the method currently used consists in measuring the torsion of the shaft connecting the output of the torque generator and the input of the power transmission box, which will be called the intermediate shaft, in order to accurately estimate the torque generated by the generator and transmitted through the PGB at the output shaft.

This method has the following disadvantages.

The torque sensor must be integrated on the intermediate shaft, so that it must be extended, which imposes space constraints and requires an adaptation of the general architecture of the propulsion system. In addition, such a measurement only allows the torque at the input of the power transmission to be measured, and not at the output as required for regulation. It is therefore necessary to calculate the torque available on the thruster. These two torques are not identical, because there are losses due to the static and dynamic behaviour of the power transmission, in particular due to friction during operation of the power transmission, temperature, oil circulation or mechanical bending of the various components, these losses being difficult to estimate. There are also losses due to power draw by accessories mounted on the power transmission box, these losses can be estimated if necessary. These different losses can cause the relationship between the torque generated at the output shaft and the torque generated at the intermediate shaft to shift in a non-linear way.

In addition, the torsion measurement of the intermediate shaft is sensitive to the integration and assembly of the various elements of the measuring system. During a maintenance operation, it is often necessary to remove the torque generator from the rest of the device. The use of a complex measuring system at the intermediate shaft increases the complexity and time of such removal and reassembly of the assembly, on the one hand, and requires a recalibration of the sensor, on the other hand, for each removal operation of the torque generator.

The invention more particularly aims at providing a simple, efficient and cost-effective solution to these problems.

For this purpose, it proposes a propulsion device for an aircraft, such as a turboprop, having a torque generator driving an output shaft via a power transmission box, the output shaft being rotatably coupled to a propeller, said power transmission box being fixed on a frame via suspension means, said suspension means having hydraulic torque recovery means comprising at least a first hydraulic system and a second hydraulic system spaced from each other, each hydraulic system having a pressure chamber whose volume varies according to the position of the power transmission housing relative to the frame, the pressure chambers of the hydraulic systems being connected by a capillary so that a hydraulic fluid is able to flow from one pressure chamber to another through the capillary, characterized in that it includes means for measuring the pressure of the hydraulic fluid within at least one of the pressure chambers and/or within the capillary and means for determining the torque transmitted to the propeller through the output shaft, in particular as a function of the pressure of the hydraulic fluid.

It appears that the pressure of the hydraulic fluid in the pressure chambers and capillary is a first-order function of the torque exerted by the power transmission housing on the frame or cradle of the device. This torque is representative of the torque to be determined, i.e. the torque generated at the output shaft, which is called the output torque. The above-mentioned losses generated during the operation of the power transmission box are therefore no longer to be taken into account in the calculation of the output torque.

In the case where the power transmission box includes an epicyclic gearbox where the planetary gear meshes with the satellites mounted on a satellite carrier and rotates inside a gear ring, the measured torque is equal to the torque transmitted by the power transmission box to the frame or cradle of the propulsion system. Depending on how the subassembly, formed by the power transmission box and torque generator, is attached to the frame, the measured torque—which is equal to the torque transmitted by the power transmission box to the frame—corresponds to the output torque to be determined or is equal to a known or determinable fraction (e. g. 80%) of the output torque to be determined, for the reasons explained below.

The invention therefore makes it possible to increase the reliability of the measurement, using low-complexity measuring equipment, which can be easily integrated into the existing structure of the propulsion system supporting the torque generator and power transmission box, without having to increase the length of the intermediate shaft. Such measuring equipment also does not require recalibration when the torque generator or PGB is removed during a maintenance operation.

The hydraulic fluid is for example oil.

The hydraulic fluid pressure measurement equipment may include a relative pressure sensor or an absolute pressure sensor.

If the pressure sensor is of the relative type, the measured pressure is compared with a reference pressure, which can be, for example, the pressure of the air outside the propulsion system.

An absolute pressure sensor, if it allows a direct measurement of the actual pressure, is more expensive and requires more maintenance.

On the other hand, a relative pressure sensor is cheaper and more reliable, but does not allow a direct measurement of the actual hydraulic fluid pressure. Such a sensor allows the pressure of the hydraulic fluid to be compared with a reference pressure. If the pressure of the air outside the propulsion system is used, for example, the variation of this external pressure should be taken into account, depending on, for example, altitude and/or temperature. However, such an adaptation is not very complex to implement since the various parameters are already measured by the engine control system. Preferably, the reference pressure is a pressure that does not change during an operating cycle of the propulsion system.

One or more pressure sensors can be located at different locations in the measuring chambers and/or capillary. Preferably, only one sensor is used to limit costs.

The suspension means may include at least one insulator mounted between the frame and the housing of the power transmission.

The insulator is for example formed by a component made of elastomer material, of the silentbloc type.

In this case, it may appear easier to place the measuring sensor at the capillary connecting the pressure chambers, so as not to modify the structure of the insulator.

Each hydraulic system can have a cylinder connected to the frame and a piston mounted movably in the cylinder and delimiting the pressure chamber with the cylinder, the piston being connected to the housing of the power transmission.

Due to its small cross-section, the capillary allows fluid to flow between the two cylinders for low speed fluid flows, i.e. for low frequency rotations generated by engine torque variations, typically between 0 Hz and 10 Hz. In this operating mode, the two pressure chambers are in opposition and counter the rotation of the PGB, the reaction pressure in the pressure chambers increasing in proportion to the rotation of the PGB. The insulators do not interfere with the suspension system. Beyond the above frequency, the capillary is blocked, the hydraulic system is open and the compressibility of the fluid in the pressure chambers is added to the stiffness of the insulators. The pressure in each cylinder then consists of a static value due to the torque exerted by the PGB housing in its low frequency component and a higher frequency dynamic component generated by the vibrations of the PGB and the frame, affected by the compressibility of the fluid and the dynamic stiffness of the insulators. The shape and dimensions of the pressure chambers and capillary are therefore adapted accordingly, depending on the type of transient event to be detected.

The two pressure chambers can be located on either side of a median axial plane extending along the outlet axis.

The means of determining the torque transmitted to the propeller are capable of taking into account parameters of the environment or operation of the propulsion system, such as for example the temperature and/or pressure of the air outside the device, altitude, flight parameters, temperature of the hydraulic fluid, etc.

These input parameters can then be used by the calculation means to adjust the determination of the output torque.

The capillary and/or pressure chambers can be designed to counter torque oscillations with frequencies up to 5 Hz, preferably up to 10 Hz.

Above this limit frequency, the pressure measurement is not affected by vibrations. Thus, in particular, in flight, the frame supporting the propulsion system is subjected to a bending moment so that the frame vibrates at frequencies above 10 Hz. These vibrations are damped by the insulators, for example, and do not affect the quality of the static pressure measurement of the hydraulic fluid.

The device may include a hydraulic fluid temperature sensor, coupled for example to the above-mentioned pressure sensor, the means for determining the torque transmitted to the propeller through the output shaft being capable of taking into account the pressure and temperature of the hydraulic fluid.

The invention also relates to a process for determining the torque transmitted to the output shaft of a thruster device of the type cited above, characterised in that it includes the steps consisting of:
(a) measuring the pressure of the hydraulic fluid in the pressure chamber and/or capillary,
(b) determining by calculation the torque transmitted to the propeller through the output shaft, in particular according to the pressure of the hydraulic fluid.

When starting the device and/or operating the device in idle mode, the hydraulic fluid pressure can be measured in such a way as to define a reference value taken into account in step (b) to calculate the torque transmitted to the thruster through the output shaft.

When starting the propulsion system and/or operating it in idle mode, the propeller blades may be positioned at a stalling angle corresponding to a so-called feathered position, in order to minimize or even cancel the thrust exerted by the turbojet. During such a start or operation in idle mode, the thrust exerted by the device is thus nil or at least insufficient to move the aircraft.

The pressure measurement performed in this operating mode provides a reference value for adjusting all measured values in the event of drift.

In addition, the suspension of the power transmission box and torque generator can be carried out in at least two axially spaced zones or frames, respectively a front frame located near the thruster, and a rear frame located, for example, at the low-pressure turbine when the torque generator is a turbomachine. Generally, the generated torque is approximately 80% at the front frame and approximately 20% at the rear frame. In other words, the reaction torque exerted by the power transmission housing on the frame, particularly on the front frame, corresponds to about 80% of the torque generated at the output shaft in this case. The ratio of the torque passing through the front frame to the torque passing through the rear frame may vary depending on the engine operating modes and engine architecture.

Thus, in order to determine the output torque by calculation using a hydraulic fluid pressure measurement, it may also be appropriate to take into account the distribution of forces between the different areas in which the suspension means are located.

Such a distribution can be measured on a test bench, as such an operation is already carried out currently and does not require any additional cost. The calibration curve thus obtained depends in particular on the stiffness of the frame and the stiffness of the insulators. This calibration curve does not depend on the torque generator itself, so it is not necessary to recalibrate if the torque generator is changed or removed during a maintenance operation.

However, such a calibration operation must be carried out in the event of a change in all or part of the suspension means, for example, this calibration operation will be carried out for other reasons in such a case.

The parameters established during calibration must be transmitted to the ECU, which is usually associated with the torque generator.

The propulsion device may include at least one chip with a memory, for example an RFID chip, in which calibration parameters are stored for integration into the ECU associated with a new torque generator, in the event of a change or maintenance of the torque generator.

In the case of a maintenance operation requiring a change of the torque generator, the various calibration parameters must be integrated into the ECU associated with a new torque generator. The use of such a chip makes this step easier.

The chip can be affixed to the frame or hydraulic systems.

The invention will be better understood, and other details, characteristics and advantages of the invention will appear upon reading of the following description given by way of a non restrictive example while referring to the appended drawings wherein:

FIGS. 1 to 3 illustrate a propulsion device 1 for an aircraft, according to one embodiment of the invention.

Figure 1:
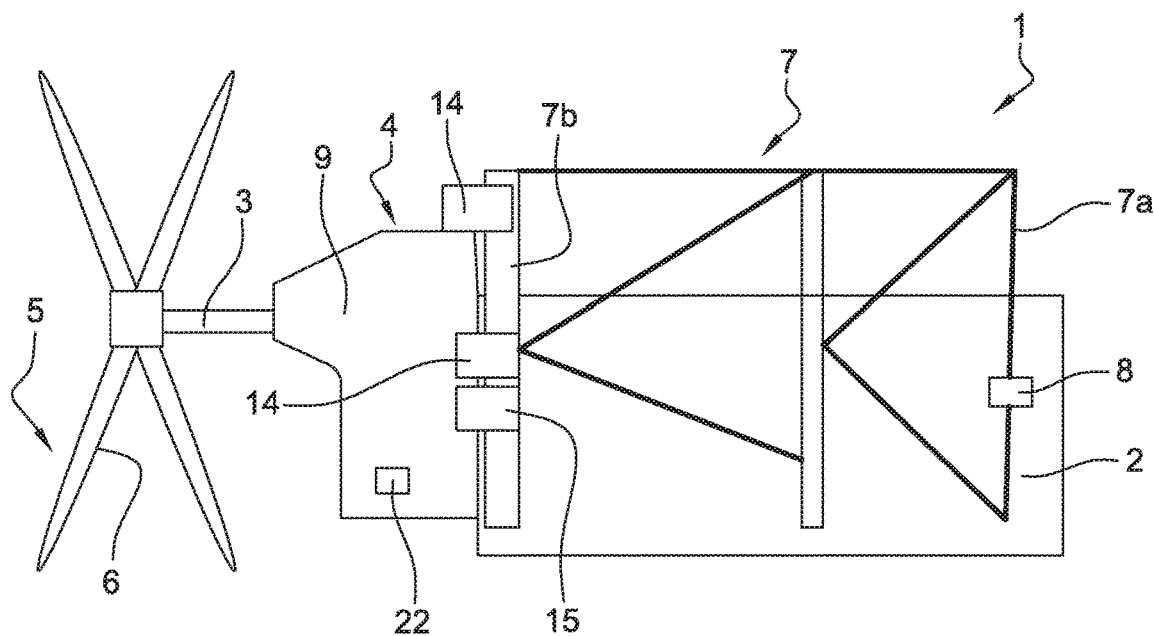
FIGS. 1 and 2 are front schematic views of a propulsion device for an aircraft, according to one embodiment of the invention.

This propulsion device 1 for an aircraft has a torque generator 2 driving an output shaft 3 via a power transmission gearbox 4, the output shaft 3 being rotatably coupled to a propeller 5.

The torque generator 2 is here a turbomachine, the propeller 5 being a propeller comprising blades 6 equipped with blade adjustment means allowing the angular position of the blades 6 to be adjusted about their axis oriented perpendicular to the output axis 3.

The torque generator 2 is fixed to a frame or cradle 7, more particularly to a so-called rear frame 7a of frame 7, by means of insulators 8. Frame 7 allows propulsion system 1 to be suspended from an aircraft structure, for example, at a wing or on a pylon attached to the fuselage (not shown).

Power Gear Box (PGB) 4 is a gearbox designed to reduce the rotational speed of the torque generator shaft 2, so as to drive the output shaft 3 equipped with thruster 5.

Figure 2:
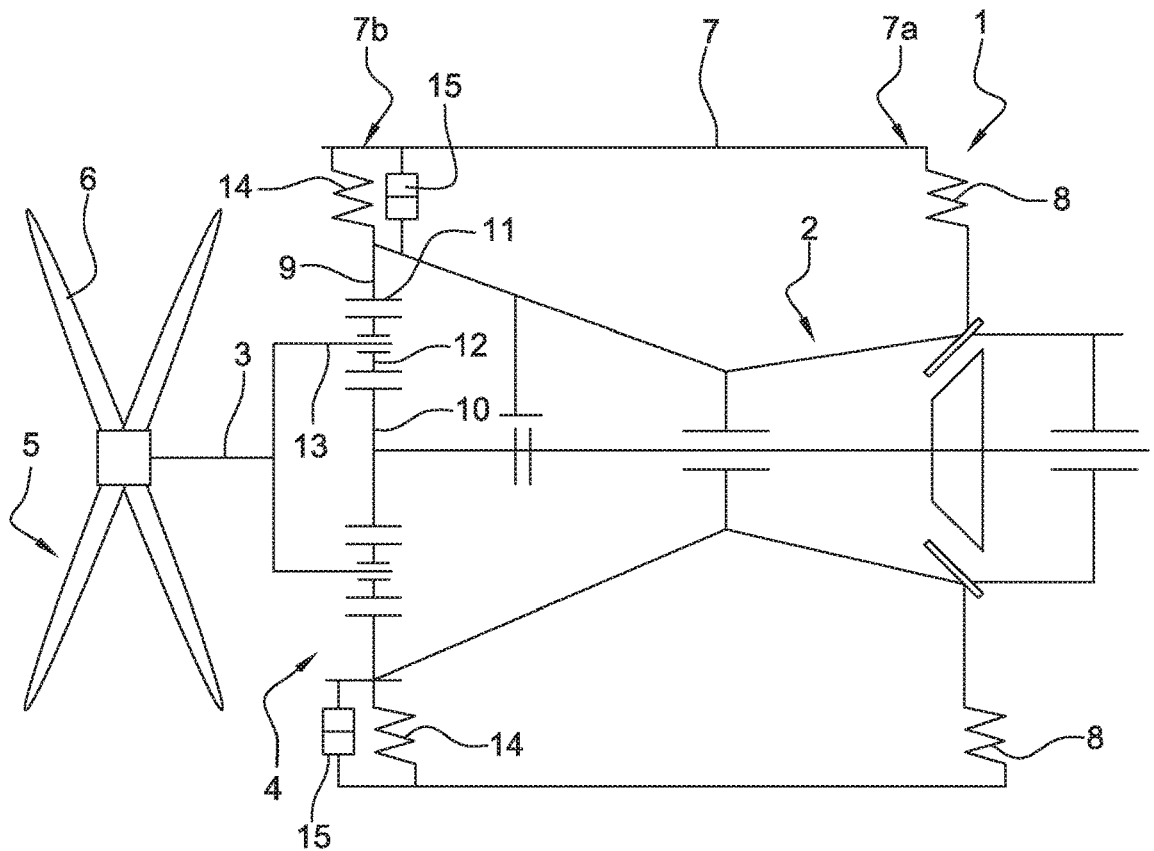

The power gear box 4 has a housing 9 and an epicyclic gearbox comprising a planetary 10 and a gear ring 11, meshing with satellites 12 (FIG. 2). Output shaft 3 is rotationally fixed to a satellite carrier 13, the latter carrying axes around which the satellites 12 are pivotally mounted. The housing 9 is mounted on a so-called front frame 7b of the frame or cradle 7 via insulators 14 and hydraulic systems 15.

The said insulators 8, 14, make it possible to avoid or limit the transmission of vibrations generated during operation, in particular to reduce noise or fatigue phenomena.

The insulators 8, 14 here are elastic studs made of elastomer material, forming silentblocs.

Figure 3:
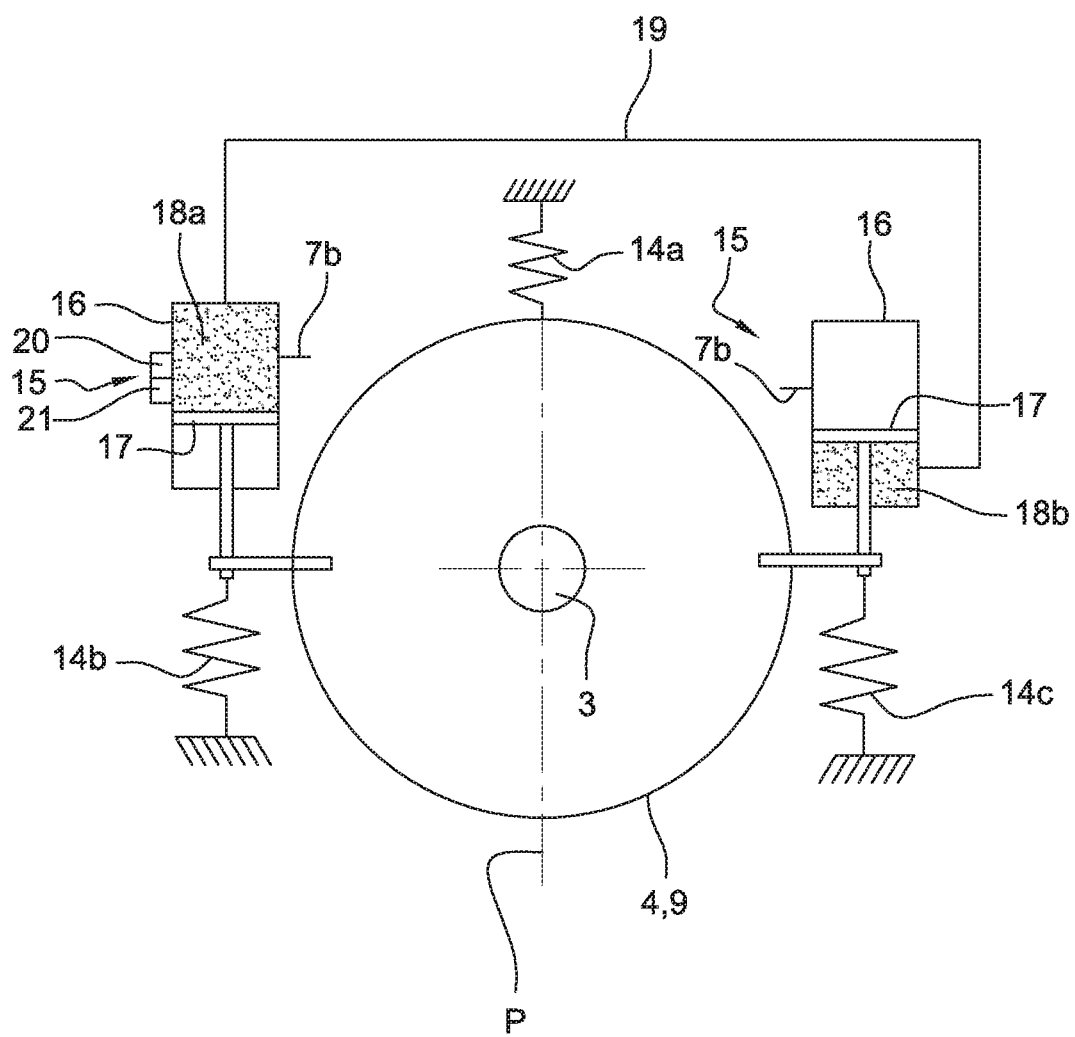
FIG. 3 is a schematic view, from the front, of a part of the propulsion device.

For example, there are three insulators 14 fitted to the front frame 7b and are placed in areas at 9, 12 and 3 o'clock respectively, by analogy with the dial of a clock. In other words, a first insulator 14a (FIG. 3) is placed on an axial median plane P passing through the output axis 3, a second and a third insulator 14b, 14c being placed on either side of said median plane P, symmetrically, as shown in FIG. 3.

Hydraulic systems 15, two in number and located in areas at 3 and 9 o'clock for example, each have a cylinder 16 in which a piston 17 is movably mounted, the cylinder and piston defining a pressure chamber 18a, 18b.

Each cylinder 16 is connected to frame 7 or respectively to frame 9 of power gearbox 4, each piston 17 being connected to frame 9 of power gearbox 4 or respectively to frame 7.

The pressure chambers 18a, 18b are connected by a capillary 19 and filled with a hydraulic fluid so that, when the housing 9 of the power gearbox 4 is moved (particularly when rotating about the outlet axis) relative to frame 7, the hydraulic fluid flows from one pressure chamber 18a to the other 18b through the capillary 19, in the manner of connected vessels. The two chambers 18a, 18b are thus in opposition and the volumes of said chambers 18a, 18b vary simultaneously, the hydraulic fluid opposing rotation about the outlet axis of the housing 9 of the power gearbox 4 with respect to frame 7.

The hydraulic fluid is for example oil.

Pressure chamber 18a, pressure chamber 18b and/or capillary 19 are equipped with at least one pressure sensor 20 and/or at least one temperature sensor 21 capable of measuring the pressure and temperature of the hydraulic fluid respectively.

Pressure sensor 20 is an absolute type sensor or a relative type sensor, the reference pressure being, for example, air pressure outside propulsion device 1.

Preferably, only one of the pressure chambers 18a, 18b is equipped with a pressure sensor 20 and a temperature sensor 21 grouped together as a single measuring module.

As previously indicated, the pressure of the hydraulic fluid in pressure chambers 18a, 18b and capillary 19 is a first order function of the torque exerted by the housing 9 of the power gearbox 4 on the frame or cradle 7 of device 1. This torque is representative of the output torque to be determined, i. e. the torque generated at output shaft 3.

It is therefore possible to determine by calculation, using an algorithm, the output torque from the hydraulic fluid pressure measurement.

Other parameters may also be taken into account by the algorithm, in particular parameters of the environment or the operation of the propulsion device, such as for example the temperature and/or pressure of the air outside the device, the altitude or the flight parameters.

Isolators 8, 14 are intended to absorb torque oscillations or high frequency vibrations, for example greater than 10 Hz, and hydraulic systems 15 are intended to counter low frequency torque oscillations, for example between 0 and 10 Hz to avoid excessive static stress on elastic studs. The pressure measurement therefore reflects the value of the "static" torque at output shaft 3, but is also suitable for measuring torque peaks generated by transient events, provided that these peaks have a bandwidth compatible with that of pressure chambers 18a, 18b and capillary 19. The shape and dimensions of the pressure chambers 18a, 18b of capillary 19 are therefore adapted accordingly, depending on the type of transient event to be detected.

Propulsion device 1 may include at least one chip 22 (FIG. 1) with a memory, for example an RFID chip, in which calibration parameters are stored for integration into the ECU associated with a new torque generator 2, in the event of a change or maintenance of said torque generator 2. For example, chip 22 is attached to the housing 9 of the power gearbox 4.

As mentioned above, in the case of a maintenance operation requiring a change of the torque generator 2, the different calibration parameters must be integrated into the ECU associated with a new torque generator 2. The use of such a chip 22 makes this step easier.

During operation, the torque generator must be regulated. For this purpose, it is equipped with an on-board computer usually referred to as EEC (Electronic Engine Control).

An important element for such regulation is the calculation of the output torque, i. e. the torque generated at output shaft 3.

For this purpose, as indicated above, the temperature and pressure measurements of the hydraulic fluid and the above-mentioned parameters of the environment or operation of the propulsion system are used. As indicated above, the calibration curve obtained during the tests is also used to determine the percentage or fraction of the said output torque passing through the hydraulic cylinders 15 and the front frame 7b.

The invention thus proposes a process and a propulsion device 1 allowing an efficient regulation of the torque generator from the torque generated at propeller 5.

The invention claimed is:

1. A process for determining a torque transmitted to a thruster through an output shaft of a propulsion device (1) for an aircraft, the propulsion device comprising:
    a torque generator (2) driving the output shaft (3) via a power gearbox (4),
    the output shaft (3) being rotatably coupled to the thruster (5),
    said power gearbox (4) being fixed on a frame (7) by means of suspension means (8, 14, 15),
    said suspension means including hydraulic torque recovery means comprising at least a first hydraulic system (15) and a second hydraulic system (15) spaced from each other,
    each hydraulic system (15) including a pressure chamber (18a, 18b) whose volume varies according to a position of a housing (9) of the power gearbox (4) relative to the frame (7),
    the pressure chambers (18a, 18b) of the hydraulic systems (15) being connected by a capillary (19) so that a hydraulic fluid is able to flow from one pressure chamber (18a) to the other (18b) via the capillary (19),
    characterized in that the propulsion device includes means (20) for measuring the pressure of the hydraulic fluid within at least one of the pressure chambers (18a, 18b) and/or within the capillary (19) and means for determining the torque transmitted to the thruster (5) through the output shaft (3) as a function of the pressure of the hydraulic fluid; wherein the process comprises:
    measuring the pressure of the hydraulic fluid in the pressure chamber (18a, 18b), the capillary (19), or both, wherein, when starting the propulsion device (1), or when operating the propulsion device (1) in an idle mode on a feathered position, or both, the pressure of the hydraulic fluid is measured in such a way as to define a reference value for a thrust which is null or insufficient to move the aircraft; and
    determining by calculation the torque transmitted to the thruster (5) through the output shaft (3) according to the pressure of the hydraulic fluid and the reference value.

2. The process of claim 1, wherein the suspension means comprise at least one insulator (14) mounted between the frame (7) and the housing (9) of the power gearbox (4).

3. The process of claim 1, wherein each hydraulic system (15) comprises a cylinder (16) connected to the frame (7) and a piston (17) movably mounted in the cylinder (16) and delimiting with said cylinder (16) the pressure chambers (18a, 18b), the piston (17) being connected to the housing (9) of the power gearbox (4).

4. The process of claim 2, wherein each hydraulic system (15) comprises a cylinder (16) connected to the frame (7) and a piston (17) movably mounted in the cylinder (16) and delimiting with said cylinder (16) the pressure chambers (18a, 18b), the piston (17) being connected to the housing (9) of the power gearbox (4).

5. The process of claim 1, wherein the two pressure chambers (18a, 18b) are located on either side of a median axial plane (P) extending along an outlet axis (3) of the housing (9).

6. The process of claim 1, wherein the means for determining the torque transmitted to the thruster (5) are capable of taking into account environmental or operating parameters of the propulsion device (1), wherein the environmental or the operating parameters, or both, comprise one or more of: a temperature and/or a pressure of air outside the propulsion device (1), an altitude, flight parameters, a hydraulic fluid temperature, or any combination thereof.

7. The process of claim 1, wherein the capillary (19) and/or the pressure chambers (18a, 18b) are designed to measure torque oscillations whose frequency extends up to at least 5 Hz.

8. The process of claim 1, wherein the propulsion device comprises at least one chip (22) comprising a memory, in which calibration parameters are stored for integration in an ECU associated with a new torque generator (2) in the event of a change or maintenance of said torque generator (2).

* * * * *